(12) United States Patent
Sherrill et al.

(10) Patent No.: US 6,761,785 B2
(45) Date of Patent: Jul. 13, 2004

(54) METHOD FOR CONSTRUCTING A COMPOSITE STRUCTURE

(75) Inventors: David E. Sherrill, Tujunga, CA (US); Kendall G. Young, Coppell, TX (US)

(73) Assignee: Northrop Grumman Corporation, Los Angeles, CA (US)

( * ) Notice: Subject to any disclaimer, the term of this patent is extended or adjusted under 35 U.S.C. 154(b) by 259 days.

(21) Appl. No.: 09/951,246

(22) Filed: Sep. 11, 2001

(65) Prior Publication Data

US 2003/0205334 A1 Nov. 6, 2003

Related U.S. Application Data

(62) Division of application No. 09/537,577, filed on Mar. 28, 2000, now Pat. No. 6,298,896.

(51) Int. Cl.⁷ .......................... B29C 43/04; B29C 51/20
(52) U.S. Cl. .................. 156/212; 156/196; 156/224; 264/219; 249/155; 249/161; 425/112
(58) Field of Search ............................... 156/477.1, 580, 156/581, 196, 212, 224; 264/219; 269/266; 425/112, 127; 249/161, 155

(56) References Cited

U.S. PATENT DOCUMENTS

| | | |
|---|---|---|
| 1,388,124 A | 8/1921 | Roberts |
| 2,462,940 A | 3/1949 | Bowes ............................ 18/56 |
| 3,140,325 A | 7/1964 | Gräff ............................ 264/93 |
| 3,348,265 A | 10/1967 | King et al. ..................... 18/19 |
| 3,596,869 A | 8/1971 | Humphrey ................... 249/155 |
| 3,737,496 A | 6/1973 | Voorhees, Sr. ............... 264/92 |
| 4,148,645 A | 4/1979 | Gates ............................ 96/46 |
| 4,212,188 A | 7/1980 | Pinson ......................... 72/413 |
| 4,267,142 A | 5/1981 | Lankheet ..................... 264/510 |
| 4,280,804 A | 7/1981 | Holland ....................... 425/388 |
| 4,457,797 A | 7/1984 | Hatchadoorian et al. .... 156/242 |
| 4,814,126 A | 3/1989 | Krueger ....................... 264/45.1 |
| 4,975,236 A | 12/1990 | MacLachlan ................ 264/553 |
| 5,151,277 A | 9/1992 | Bernardon et al. ........ 425/112 |
| 5,152,861 A | 10/1992 | Hann ........................... 156/230 |
| 5,316,462 A | 5/1994 | Seemann ..................... 425/112 |
| 5,593,700 A | 1/1997 | Stilgenbauer ................. 425/3 |
| 5,824,255 A | 10/1998 | Ross et al. .................. 264/316 |
| 5,876,654 A | 3/1999 | Blonigen et al. ........... 264/316 |

*Primary Examiner*—Sam Chuan Yao
(74) *Attorney, Agent, or Firm*—Fulbright & Jaworski L.L.P.

(57) ABSTRACT

A method for constructing a composite structure is disclosed. The method comprises four steps. Step one calls for coupling a flexible layer to a base, where the flexible layer has a working surface and an underside surface. Step two requires coupling at least one support element to the underside surface of the flexible layer. The next step calls for coupling at least one adjustable element to the support element for adjusting the position of the flexible layer. The last step requires configuring the flexible layer to a configuration suitable for constructing the composite structure. More specifically, the flexible layer may have internal reinforcing elements for added strength and durability.

12 Claims, 2 Drawing Sheets

METHOD FOR CONSTRUCTING A COMPOSITE STRUCTURE

RELATED APPLICATIONS

This is a divisional application of U.S. Ser. No. 09/537,577, filed Mar. 28, 2000 now U.S. Pat. No. 6,298,896 and entitled "Apparatus for Constructing a Composite Structure" by David E. Sherrill and Kendall G. Young.

TECHNICAL FIELD OF THE INVENTION

This invention relates generally to the field of materials construction and, more specifically, to an apparatus and method for constructing a composite structure.

BACKGROUND OF THE INVENTION

Composite structures are desirable in many industries for many applications. For example, aircraft, space, and land/sea vehicles employ a variety of curved and multiple-contoured surface structures in their fabrication. Composite materials such as fiberglass/resin are commonly used for these structures because, among other desirable attributes, composite materials have high strength-to-weight ratios. Because of the ever-increasing use of composite structures throughout industry, manufacturers are continually searching for better and more economical ways of forming composite structures.

In the forming of composite structures many manufacturing steps are performed. One such step that is usually required is a curing step. During the cure process, composites must be formed over tooling that restrains them. These tools are generally monolithic dies that are machined or cast from a solid block to conform to a specific surface shape and, therefore, cannot have their shape modified once created. Subsequent structures having different surface shapes, though similar, must have a new tool fabricated. This is a source of manufacturing time and expense. In addition, such monolithic dies are bulky, require much setup time at the form press prior to commencement of manufacturing, and utilize large amounts of storage space when not in a production mode. Present solutions attempting to resolve this problem have relied on metallic tooling surfaces that can be reconfigured. They utilize articulating sections, sliding pins, and other methods to change the shape of the tooling surface. These methods can leave dimples on the surface of the finished structure due to the nature of the reconfigurable elements. To alleviate the problem of dimpling, manufacturers employ many reconfigurable elements spaced very close to one another. However, the more hardware, the greater the expense and maintenance. Furthermore, structure size can be limited by these methods since scale-up can be cumbersome and expensive. And when large quantities of various contoured surface structures are required, each structure would require a separate rigid surface tool and would have to be durable enough for a production run. Lower cost tooling material options such as foam, which can be easily machined to create a family of tools, do not have the desired durability and each would require its own support base adding to the tool's cost.

The challenges in the field of materials construction have continued to increase with demands for more and better techniques having greater flexibility and adaptability. Therefore, a need has arisen for a new apparatus and method for constructing a composite structure.

SUMMARY OF THE INVENTION

In accordance with the present invention, an apparatus and method for constructing a composite structure is provided that substantially eliminates or reduces disadvantages and problems associated with previously developed apparatuses and methods.

An apparatus for constructing a composite structure is disclosed. The apparatus comprises a flexible layer, which has a working surface and an underside surface, coupled to a base. At least one support element is coupled to the underside surface of the flexible layer, and at least one adjustable element is coupled to the support element for adjusting the position of the flexible layer. More specifically, the flexible layer may have internal reinforcing elements for added strength and durability.

A method for constructing a composite structure is disclosed. The method comprises four steps. Step one calls for coupling a flexible layer to a base, where the flexible layer has a working surface and an underside surface. Step two requires coupling at least one support element to the underside surface of the flexible layer. The next step calls for coupling at least one adjustable element to the support element for adjusting the position of the flexible layer. The last step requires configuring the flexible layer to a configuration suitable for constructing the composite structure. More specifically, the flexible layer may have internal reinforcing elements for added strength and durability.

A technical advantage of the present invention is to provide a durable tool surface that can be quickly reconfigured to produce a myriad of contoured surface structures, including prototypes for demonstration programs.

Another technical advantage of the present invention is that the flexible layer has internal reinforcing rods that have the ability to slide within the flexible layer's volume, thus permitting the flexible layer to be stretched in the plane of the material while resisting flexure in the direction perpendicular to the material. The rods support the flexible layer as it is being manipulated perpendicular to the plane of the material. This insures that a uniform surface curvature can be generated in the flexible material. In addition, the internal reinforcing rods, combined with the support elements underneath the flexible layer, help to avoid any "pillowing effect" of the flexible layer between the support elements. The reinforcing rods also increase the strength and durability of the forming tool.

A further technical advantage is that the present invention can be used for the construction of room temperature cured composites having large length and width dimensions. This is because there are no constraints such as the tool being able to fit inside of an autoclave.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF THE INVENTION

The preferred embodiments of the present invention and its advantages are best understood by referring now in more detail to FIGS. 1–4 of the drawings, in which like numerals refer to like parts.

Figure 1:
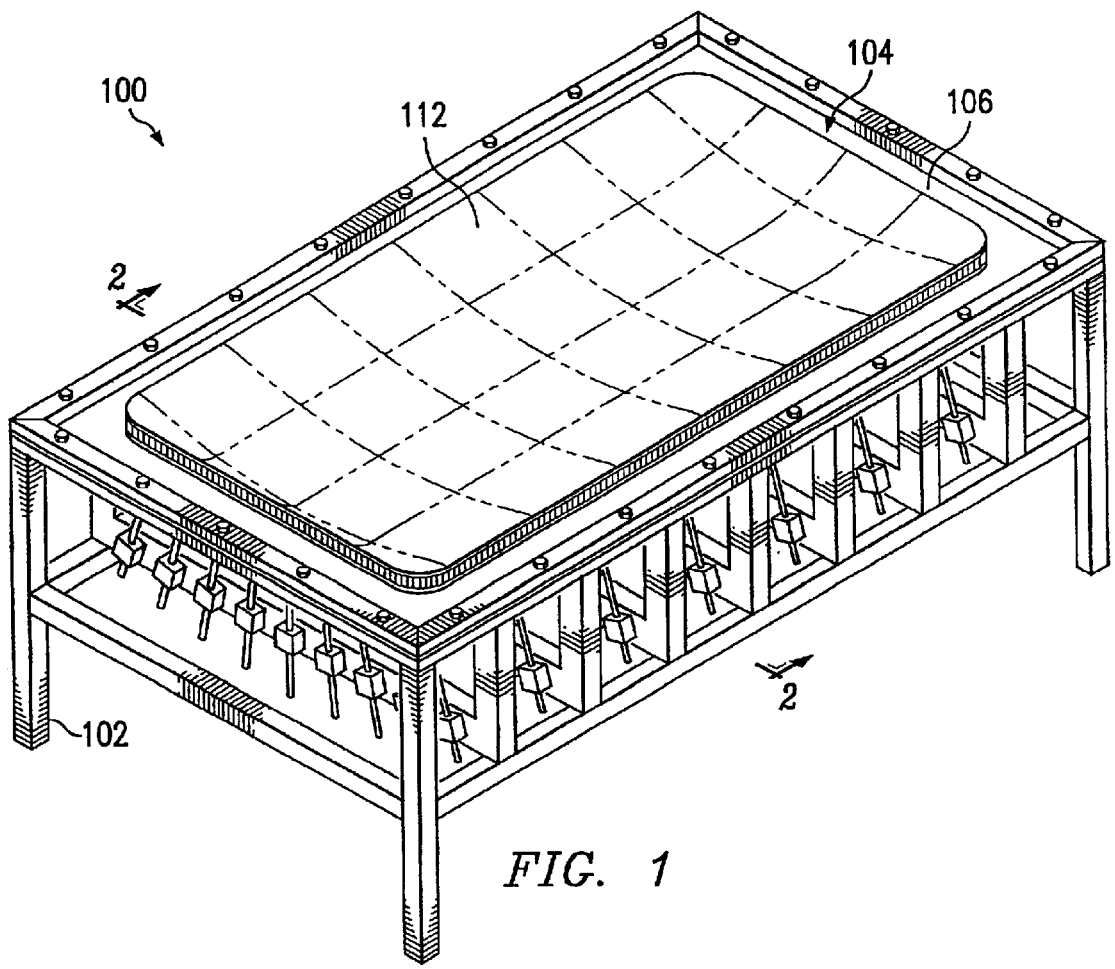
FIG. 1 is a perspective view illustrating one embodiment of an apparatus useful in the practice of the present invention.
Figure 3:
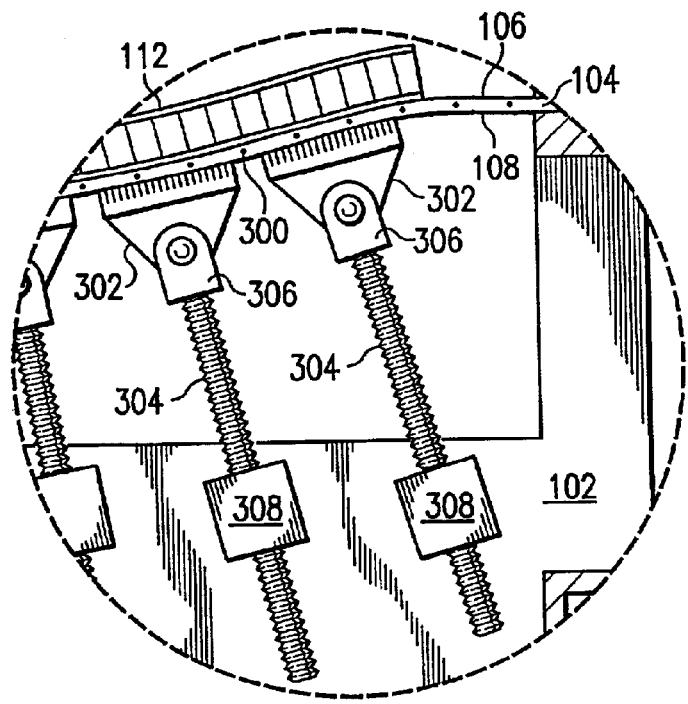
FIG. 3 is a cross-sectional fragmented view showing, in greater detail, the reinforcing elements, support elements, and adjustable elements of the apparatus in FIG. 1.

FIG. 1 is a perspective view illustrating one embodiment of an apparatus 100 useful for constructing a composite structure 112. Apparatus 100 comprises a flexible layer 104 coupled to a base 102. Flexible layer 104 has a working surface 106 and an underside surface 108. As best shown in FIG. 3, apparatus 100 also comprises support elements 302 that are coupled to underside surface 108, and adjustable elements 304 that are coupled to support elements 302.

Flexible layer 104 is an elastomeric material such as polyurethane. However, other types of elastomeric materials may be used as long as they are resilient enough to be shaped into a myriad of contoured surfaces. As examples, two such types of material are neoprene and rubber. The shape and thickness of flexible layer 104 is dependent upon the size, shape, and material type of composite structure 112. Since apparatus 100 may be used for an infinite number of composite structures 112, then flexible layer 104 may also be an infinite number of shapes and thicknesses.

Figure 2:
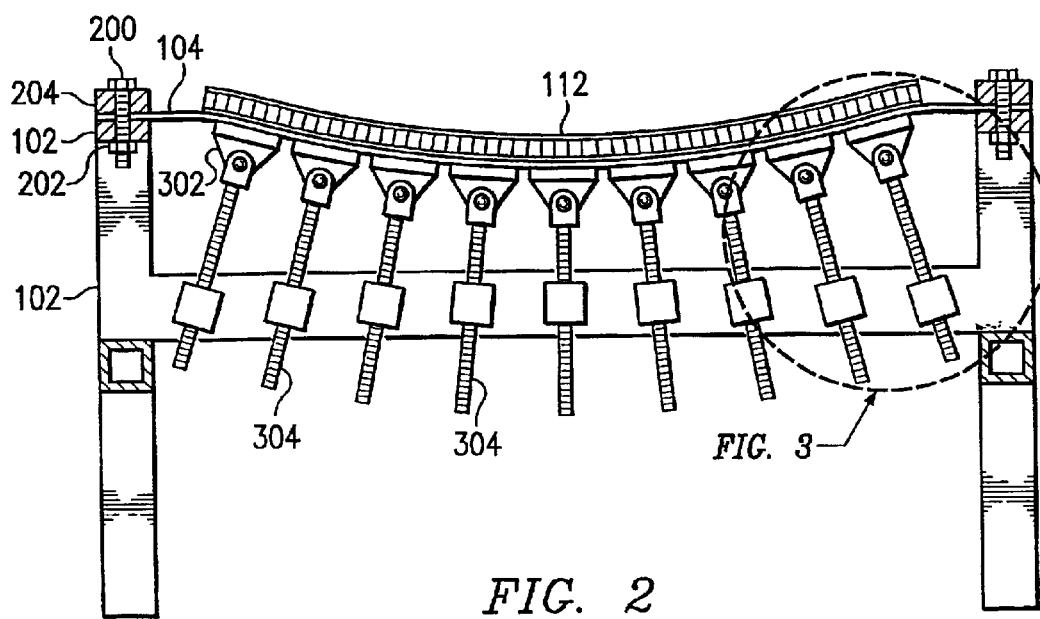
FIG. 2 is a cross-sectional view of the apparatus in FIG. 1 showing one clamping arrangement for the flexible layer, and one arrangement of adjustable elements useful in the practice of the present invention.

Referring to FIGS. 1 and 2, one embodiment of the present invention shows flexible layer 104 being clamped to the periphery of base 102 with bolts 200, nuts 202, and clamping bar 204. Clamping bar 204 may cover the full periphery of base 102 (as best shown in FIG. 1). If clamping bar 204 is not included, there may be individual washers for each bolt 200 and nut 202. Other ways of coupling flexible layer 104 to base 102 are contemplated by the present invention. For example, flexible layer 104 may be screwed or bonded to base 102. As long as flexible layer 104 is restrained on its periphery, any type of coupling suffices.

Base 102 is generally a steel frame structure. However, other types of materials may be used for base 102, such as other metals, composite materials, or plastics. Base 102 needs to be of a size and shape that will allow support elements 302 and adjustable elements 304 to function underneath flexible layer 104.

FIG. 3 illustrates one technical advantage of the present invention. Reinforcing elements 300 are coupled to flexible layer 104. Reinforcing elements 300 have the ability to slide within the volume of flexible layer 104, thus permitting flexible layer 104 to be stretched in the plane of flexible layer 104 while resisting flexure in the direction perpendicular to flexible layer 104. Reinforcing elements 300 may be coated with a release agent to aid in the slidability of reinforcing elements 300 within flexible layer 104. Reinforcing elements 300 are generally made of structural steel or other types of metal such as aluminum. However, the present invention contemplates other types of materials as long as the required strength and durability of flexible layer 104 and apparatus 100 is obtained. Reinforcing elements 300 are coupled to flexible layer 104 by arranging them in a desired pattern depending on the type of strength and durability desired, and then pouring the matrix that makes up flexible layer 104 over the arrangement of reinforcing elements 300. This process is similar to the pouring of concrete over re-bar when constructing concrete structures. Reinforcing elements 300 may be coupled to flexible layer 104 in other ways, such as manufacturing flexible layer 104 with conduits in its volume, and subsequently sliding reinforcing elements 200 into the conduit. In another embodiment, reinforcing elements 300 are not coupled to flexible layer 104. This would be the case where little strength is needed when constructing composite structure 112.

Also shown in FIG. 3, support elements 302 are shown to be coupled to underside surface 108 of flexible layer 104. This coupling is preferably an adhesive bonding. However, support elements 302 may be coupled using other methods, such as mechanical methods. Support elements 302 are typically made of structural steel. However, other types of materials are contemplated by the present invention, such as other metals, composite materials, or plastics. Support elements 302 will generally have a substantially square shape in the area where it couples to flexible layer 104. However, support elements 302 may be any shape desirable. Support elements 302 are closely spaced in a pattern that permits uniform stretching of flexible layer 104. The lesser the space there is between support elements 302, the lesser chance of a "pillowing effect" resulting between support elements 302. Spacing of support elements 302 is a function of the thickness of flexible layer 104, its inherent stiffness, the size of reinforcing elements 300 and amount of displacement required to create the desired apparatus 100 surface shape. The substantially square shape of support elements 302 is the best way to reduce the gaps between support elements 302. In addition, support elements 302 have a larger surface area than adjustable elements 304, which will reduce cost by reducing the number of adjustable elements 304 required.

Still referring to FIG. 3, support elements 302 are shown to be coupled to adjustable elements 304. Coupling of support elements 302 to adjustable elements 304 may be accomplished by a clevis 306. However, other coupling arrangements may be employed, such as hinging, bolting, welding, or adhesive bonding. Adjustable elements 304 are preferably screw jacks that allow for the adjustment of the position of flexible layer 104. There can be other ways of adjusting the position of flexible layer 104 instead of using screw jacks, such as electric motors, hydraulic mechanisms, or a pneumatic mechanisms. Adjustable elements 304 may or may not be coupled to base 102, depending on what type of arrangement is used for adjustable elements 304. Adjustable elements 304 provide a technical advantage for the present invention in that a durable surface of apparatus 100 can be quickly reconfigured to produce a myriad of contoured surface structures. This will also allow prototypes for demonstration programs to be quickly manufactured.

Figure 4:
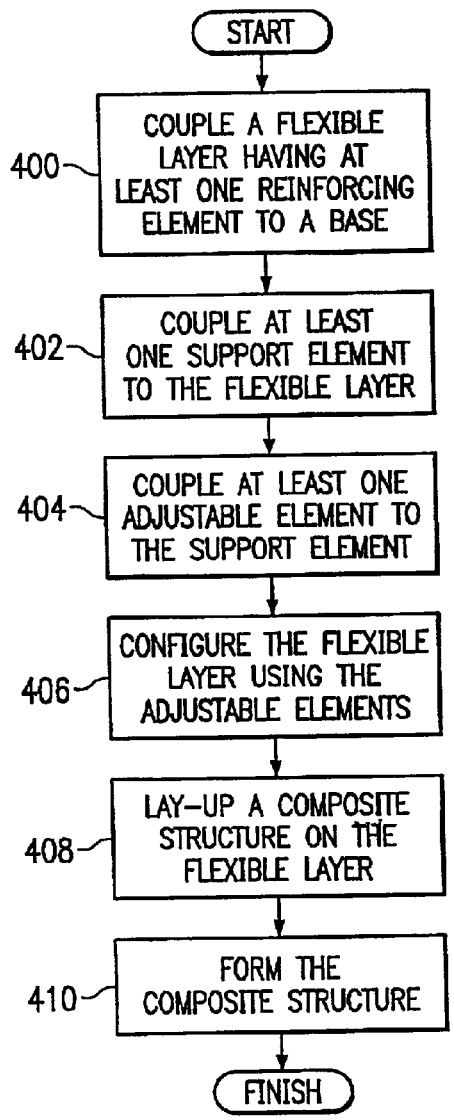
FIG. 4 is a flowchart demonstrating one method of constructing a composite structure in accordance with the present invention.

FIG. 4 is a flowchart demonstrating one method of constructing composite structure 112 in accordance with the present invention. In one embodiment, flexible layer 104 is coupled to a base 102 at step 400. Flexible layer 104 may have at least one reinforcing element 300 coupled thereto. At least one support element 302 is coupled to flexible layer 104 at step 402, and at least one adjustable element 304 is coupled to support element 302 at step 404. Adjustable element 304 may be a screw jack. Adjustable elements 304 are used to configure flexible layer 104 to a desired shape and contour at step 406. This shape or contour depends upon what type of composite structure 112 is being formed. Composite structure 112 is then layed-up on flexible layer 104 at step 408, and composite structure 112 is formed at step 410.

In one embodiment of the present invention, apparatus 100 is used for room temperature forming of composite structure 112. The present invention also contemplates elevated temperature forming of composite materials. In elevated temperature forming, the maximum temperature of apparatus 100 will depend upon the material used for flexible layer 104. The present invention is especially suited for the VARTM (Vacuum Assisted Resin Transfer Molding) process that is proprietary to Northrop Grumman Corporation.

Composite structure 112 may be layed-up on flexible layer 104 as a solid laminate or as a sandwich-type composite material assembly. If a sandwich-type structure is layed-up, then the core material will be prepared so that it can be easily draped over the surface of flexible layer 104. This is a technical advantage of the present invention in that it has the ability to fabricate a compound curvature sandwich shape. An example of a core material is balsa wood. The balsa wood, or other core material, needs to be "diced" so that it can conform to the surface of flexible layer 104 when layed-up. This type of "diced" core that permits a draping of the core material is readily available through commercial vendors. After laying-up the materials that comprise composite structure 112, a vacuum bag forming process, that is well known in the art of forming composite materials, may be performed.

Although an embodiment of the invention and its advantages are described in detail, a person skilled in the art could make various alternations, additions, and omissions without departing from the spirit and scope of the present invention as defined by the appended claims.

What is claimed is:

1. A method for constructing a composite structure, the method comprising:
   coupling a flexible layer to a base, the flexible layer having a working surface and an underside surface;
   slidably coupling at least one reinforcing element to and within the flexible layer;
   coupling at least one support element to the underside surface of the flexible layer;
   coupling at least one adjustable element to the support element;
   configuring the flexible layer to a configuration suitable for constructing the composite structure; and
   forming the composite structure on the working surface of the flexible layer.

2. The method of claim 1 wherein the flexible layer is an elastomeric material.

3. The method of claim 1 wherein coupling the flexible layer to the base comprises clamping.

4. The method of claim 1 wherein coupling the support element to the underside of the flexible layer comprises adhesive bonding.

5. The method of claim 1 wherein coupling the adjustable element to the support element comprises hingedly connecting.

6. The method of claim 1 wherein the adjustable element is a screw jack.

7. A method for constructing a composite structure, the method comprising:
   securing a periphery of a flexible layer to a base, the flexible layer having a working surface and an underside surface;
   slidably coupling a plurality of reinforcing elements to and within the flexible layer;
   coupling a plurality of support elements to the underside surface of the flexible layer;
   coupling a plurality of adjustable elements to the support elements;
   adjusting the plurality of adjustable elements to configure the flexible layer to a configuration suitable for constructing the composite structure;
   placing the composite structure on the working surface of the flexible layer; and
   forming the composite structure.

8. The method of claim 7 wherein the flexible layer is an elastomeric material.

9. The method of claim 7 wherein securing the periphery of the flexible layer to the base comprises clamping.

10. The method of claim 7 wherein coupling the support elements to the underside of the flexible layer comprises adhesive bonding.

11. The method of claim 7 wherein coupling the adjustable elements to the support elements comprises hingedly connecting.

12. The method of claim 7 wherein the adjustable elements are screw jacks.

* * * * *